United States Patent [19]

Dowell

[11] Patent Number: 4,721,191

[45] Date of Patent: Jan. 26, 1988

[54] DISC BRAKE

[75] Inventor: Frederick S. Dowell, Coventry, United Kingdom

[73] Assignee: Massey-Ferguson Services N.V., Curacao, Netherlands Antilles

[21] Appl. No.: 322,784

[22] Filed: Nov. 19, 1981

[30] Foreign Application Priority Data

Nov. 26, 1980 [GB] United Kingdom ............... 8037881
Nov. 26, 1980 [GB] United Kingdom ............... 8037938

[51] Int. Cl.4 ............... F16D 65/10; F16D 65/78; F16D 13/60
[52] U.S. Cl. ............... 188/218 XL; 188/264 D; 192/113 R
[58] Field of Search ............... 188/71.1, 71.5, 71.6, 188/218 XL, 218 R, 264 R, 264 D, 264 E; 192/107 R, 113 R; 267/161

[56] References Cited

U.S. PATENT DOCUMENTS

| 2,380,900 | 7/1945 | Wellman | 267/161 |
|---|---|---|---|
| 2,850,118 | 9/1958 | Byers | 188/218 XL |
| 2,987,143 | 6/1961 | Culbertson et al. | 188/218 XL |
| 3,063,531 | 11/1962 | Aschaver | 192/113 R |
| 3,094,194 | 6/1963 | Kershner | 188/71.5 |
| 3,124,216 | 3/1964 | Buyze | 188/264 D |
| 3,198,295 | 8/1965 | Fangman et al. | 188/218 XL |
| 3,289,797 | 12/1966 | Brzezinski et al. | 188/264 R |
| 3,903,998 | 9/1975 | Klaue | 188/71.6 |
| 3,937,303 | 2/1976 | Allen et al. | 192/107 R |
| 4,027,758 | 6/1977 | Gustavsson et al. | 188/264 E |
| 4,146,116 | 3/1979 | Cumming | 188/71.5 |
| 4,169,523 | 10/1979 | Malinowski et al. | 188/71.5 |

FOREIGN PATENT DOCUMENTS

| 0089938 | 1/1895 | Fed. Rep. of Germany . | |
| 1947672 | 2/1971 | Fed. Rep. of Germany . | |
| 2042289 | 3/1972 | Fed. Rep. of Germany . | |
| 2209634 | 9/1973 | Fed. Rep. of Germany . | |
| 2453348 | 5/1975 | Fed. Rep. of Germany . | |
| 2018728 | 8/1979 | Fed. Rep. of Germany | 188/71.1 |
| 2178389 | 9/1973 | France . | |
| 7004729 | 3/1975 | Sweden . | |
| 0796843 | 8/1956 | United Kingdom . | |
| 0958991 | 5/1964 | United Kingdom . | |
| 1276197 | 6/1972 | United Kingdom . | |
| 1309633 | 3/1973 | United Kingdom . | |
| 1350743 | 4/1974 | United Kingdom . | |
| 1415193 | 11/1975 | United Kingdom . | |
| 1460591 | 1/1977 | United Kingdom . | |
| 1553973 | 10/1979 | United Kingdom . | |

Primary Examiner—Andres Kashnikow
Assistant Examiner—Robert J. Oberleitner

[57] ABSTRACT

A disc for use as a rotor (10) or stator (18) in a multiple-disc brake. The disc (10) has an annular peripheral band (15) provided with a series of circumferentially spaced through slots (12) which open through a periphery of the disc. Each slot is defined by edges (13, 13a) which extend away from the periphery across the annular peripheral band (15) and are inclined in opposite directions ($\alpha$) to a given radius (14) of the disc extending therebetween so that the slot tapers in a radial sense.

A multiple disc brake is also provided which has a housing (46, 47) containing oil or other coolant which encloses a disc stack in the form of interleaved sets of rotor (10) and stator (18) discs. One set of discs (10) has a series of circumferentially spaced generally radially extending through slots (12) with inclined edges (13, 13a) extending from one periphery of the stack and the other set of discs (18) has a series of circumferentially spaced generally radially extending coolant access cut-outs (26) extending from the other periphery of the stack. Portions of the slots (12) and cut-outs (26) are arranged to periodically overlap each other during relative rotation of the rotors and stators at locations outside the bands of frictional contact (15) of the rotors and stators to provide a radial flow path (31) for coolant across the stack.

The disc and brake are applicable to a wide range of uses including agricultural and industrial tractors.

4 Claims, 5 Drawing Figures

DISC BRAKE

TECHNICAL FIELD

This invention relates to disc brakes and parts thereof and in particular to disc brakes with a multiple of discs, hereinafter referred to as multiple-disc brakes of the kind specified, which comprise a disc stack in the form of a number of axially-movable and interleaved rotor and stator discs of annular form, and an actuator for axially moving the interleaved discs into engagement with each other to apply the brake.

DISCLOSURE OF THE INVENTION

It is an object of the present invention to provide an improved form of multiple-disc brake of the kind specified by the provision of an improved form of rotor and/or stator disc.

According to the present invention there is provided a rotor or stator disc for use in a multiple-disc brake of the kind specified in which an annular band of the disc is provided with a series of circumferentially spaced through slots which open through a periphery of the disc, each slot being defined by edges which extend away from said periphery across said peripheral band and are inclined in opposite directions to a given radius of the disc extending therebetween so that the slot tapers in a radial sense.

The slots serve both as thermal relief slots, to help prevent dishing of the disc, and also particularly when the brake is cooled by oil or other liquid coolant, as flow paths to assist the generally radial flow of such coolant from one periphery of the disc stack to the other.

As explained in more detail below, since the sides of the slots are inclined to radii of the disc, this ensures that when the brake is applied and the slotted band of the disc comes into friction contact with a co-operating slotted band of another brake disc or discs, the edges of the slots in the contacting bands of the discs execute a scissors-like action as they pass over each other thus avoiding sudden edge to edge contact along the entire lengths of the trailing edges of the rotors slots and the oppositely facing edges of the stators, which might occur if the slot edges in all contacting discs were disposed along radii of the discs. This significantly reduces the torque fluctuations which will occur during a brake application and the wear on the contacting slotted bands of the discs.

In a preferred construction both sides of each slot are inclined at equal angles in opposite directions to said given radius so that the performance of the disc is identical in each direction of rotation of the brake and the disc construction is not "handed", that is it can be assembled into the brake stack either way round.

Preferably the closed ends of the slots in the disc terminate in part-circular formations to provide relief from under stress concentrations.

The inclination of the sides of the slots may be such as to produce a slot whose width in a circumferential sense reduces with increasing distance from said periphery.

Alternatively, it may be desirable to adopt the reverse arrangement and arrange the slot width to increase with increasing distance from said periphery so that opening of the slot through said periphery produces a restriction to the radial flow of coolant along the slot thus enabling this flow to be controlled by suitable sizing of the slot opening.

Although in a preferred construction both the rotors and stators of a multiple-disc brake of the kind specified are provided with the tapering slot configuration of the present invention in their contacting bands it is sufficient for only the rotors or stators to employ the tapering slot configuration of the present invention in order to achieve the above described scissor-like action as the slots pass over each other.

The present invention also provides a multiple-disc brake employing rotors and/or stators having the above described tapering slot configuration.

The present invention also provides a multiple disc brake of the kind specified having a housing containing oil or other coolant which encloses the disc stack and in which the rotor discs are provided with a first series of circumferential spaced generally radially extending cut-outs and the stator discs are provided with a second series of circumferential spaced generally radially extending cut-outs, one series of cut-outs opening through the inner periphery of the disc stack, the other series of cut-outs opening through the outer periphery of the stack, and portions of the two series of cut-outs being arranged to periodically overlap each other during relative rotation of the rotors and stators at locations outside the bands of frictional contact of the rotors and stators to provide a flow path for coolant from one series of cut-outs to the other.

The provision of the above overlapping cut-out arrangement in the rotors and stators ensures a good radial distribution of coolant within the brake. Also, since the two series of cut-outs overlap at locations outside the bands of frictional contact of the rotors and stators neither series of cut-outs has a closed end which terminates within the bands of frictional contact. This avoids the possibility of any such closed ends wearing a circumferentially extending ridge in any contacting disc member.

In a preferred form of the invention at least one of the series of cut-outs are provided as radially extending thermal, relief slots. The tapering form of relief slot described above is particularly suitable. Where a relatively narrow type of thermal relief slot is employed as one of the series of cut-outs, the width (in a circumferential sense) of the slot is preferably enlarged at a location outside the bands of frictional contact of the rotors and stators in order to assist in providing an adequate overlap of the two series of cut-outs.

The present invention also provides a rotor or stator disc for use in a multiple-disc brake of the kind specified having a series of cut-outs extending from one periphery which terminate (in a radial sense) at locations outside the band of frictional contact of the disc.

DESCRIPTION OF DRAWINGS

One embodiment of the present invention will now be described, by way of example only, with reference to the accompanying drawings in which.

BEST MODE OF CARRYING OUT INVENTION

Figure 1:
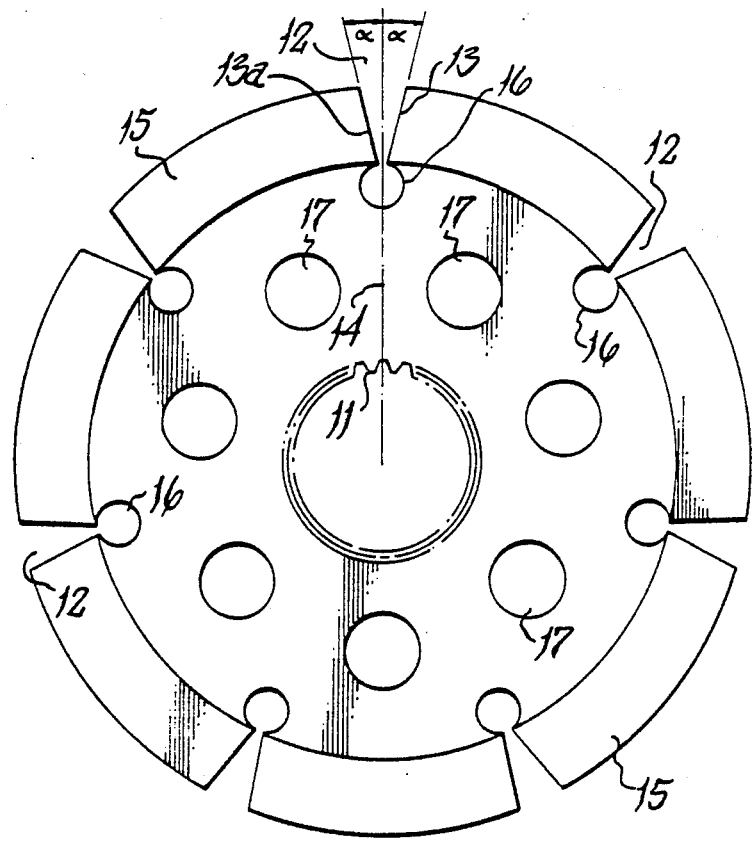
FIG. 1 is a side view of a rotor disc for use in an oil immersed vehicle multiple-disc brake having radial slots in its outer periphery.

Referring to FIG. 1 this shows an annular rotor disc 10 which is provided with splines 11 for connection with a central shaft (not shown) to be braked. The outer periphery of the rotor disc is provided with a series of circumferentially spaced cut-outs in the form of thermal relief slots 12 which open through the outer periphery. The edges 13, 13a of these slots are equally inclined at an angle $\alpha$ of say 15° in opposite directions to a radius 14 of the disc so that the slots taper in a radial sense.

Figure 5:
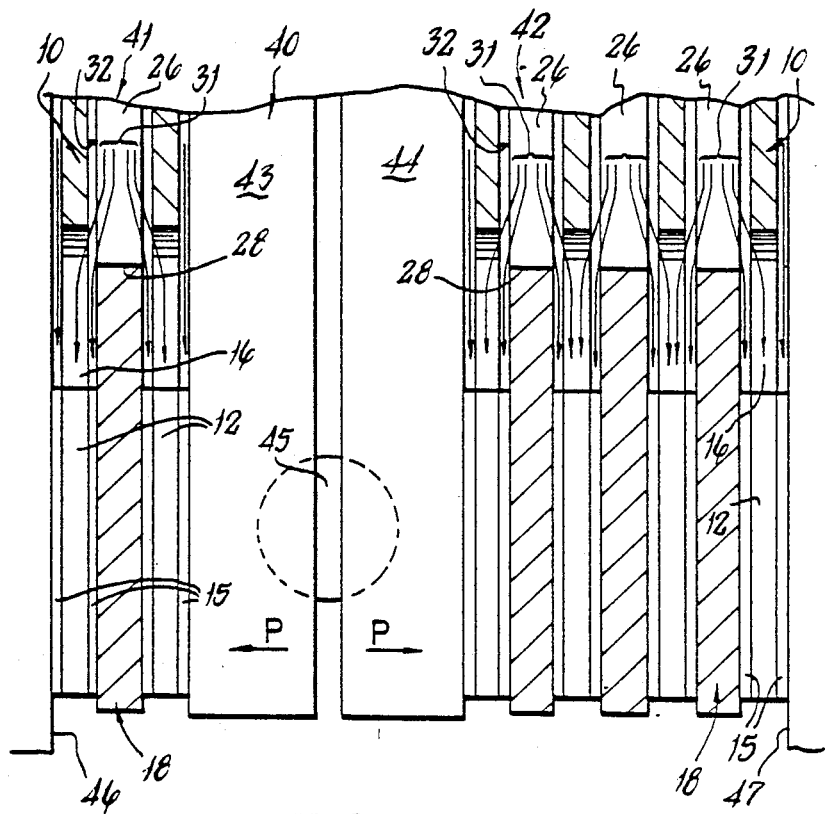
FIG. 5 shows a diagrammatic radial section through part of a multiple-disc brake including the rotors and stators of FIGS. 1 and 2.

The slots 12 extend across an annular band of friction material 15 which, as can be seen from FIG. 5, is applied to both sides of the disc 10 thus splitting the friction material into a number of generally arcuately shaped areas. These bands of friction material are provided with spiral groove patterns (not shown) formed in their friction surfaces which promote the flow of coolant oil across the friction bands, as explained below, when the disc is installed in a multiple-disc brake of the kind specified.

The radially inner ends of slots 12 are formed by part-circular apertures 16 to relieve possible undue stress concentrations and to provide oil reservoirs, as explained below, for the radial passage of oil across the friction material bands. Additional holes 17 are formed in the rotor to ensure a good axial distribution of oil when the rotor is installed in a multiple-disc brake of the kind specified.

Figure 2:
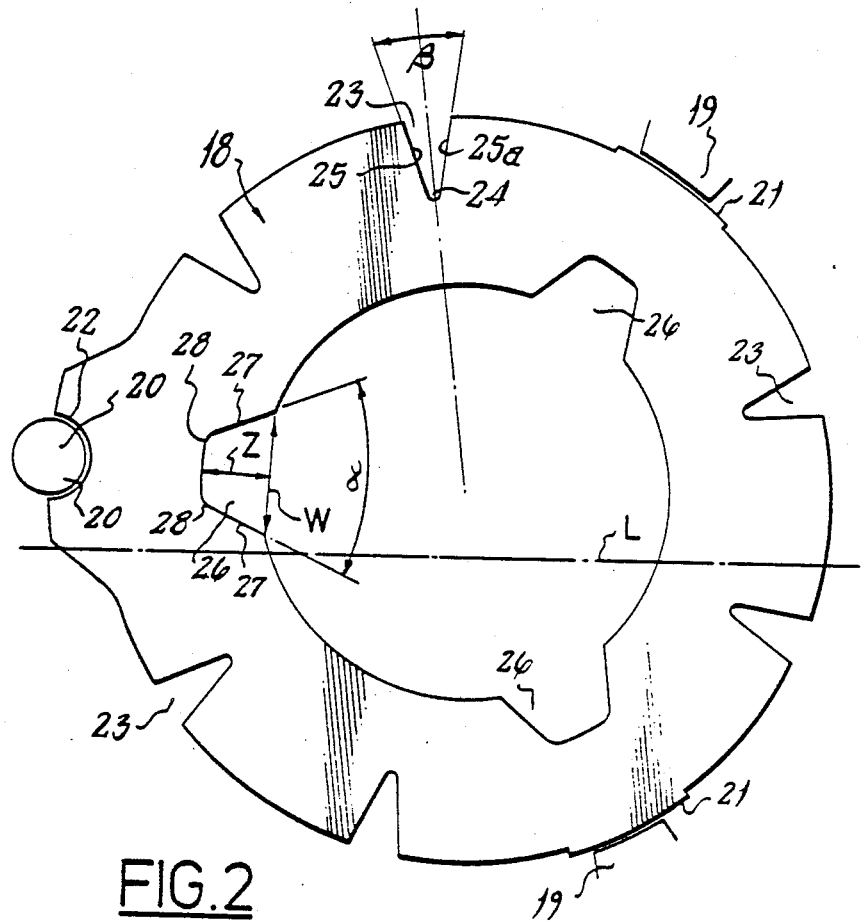
FIG. 2 is a side view of a stator disc provided with the tapering slots of the present invention for use in an oil immersed vehicle multiple-disc brake.

The stator disc 18 shown in FIG. 2 is arranged to be supported within a brake housing (not shown) by two abutments diagrammatically indicated at 19 and a removable torque pin 20. The abutments 19 engage raised portions 21 on the outer periphery of the stator and torque pin 20 engages a specially formed cut-out 22.

The outer periphery band of the stator which will engage the friction band 15 of rotor 10 when the rotor 10 and stator 18 are installed in interleaved relation in a brake is provided with slots 23 which are again of tapering form and whose inner ends are radiused at 24. Slots 23 split the outer peripheral band of the stator into a number of generally arcuately-shaped areas of frictional contact with band 15. The included angle $\beta$ between the edges 25, 25a of slots 23 is again typically 30° as in rotor 10 described above.

Figure 3:
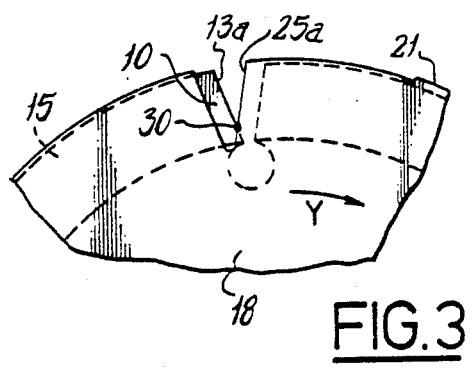
FIG. 3 shows in diagrammatic form the co-operation of tapering slots of the rotor and stator as they pass over each other during a brake application.

FIG. 3 diagrammatically illustrates the scissor-like action which takes place between the trailing edges 13a of the slots 12 in rotor 10 and edges 25a of the stator slots 23 as the rotor rotates in a clockwise sense as indicated by arrow Y and the two slots pass over each other during a brake application. As will be observed the point of contact 30 between edges 13a and 25a moves radially outwardly and the possibility of sudden full contact along the entire length of edges 13a and 25a (which could occur if both these edges were disposed along radii of their respective discs) is avoided. It will be understood that the equal inclination of edges 13, 13a and 25, 25a to their respective radii 14 and 31 ensures that the above described scissoring action occurs in both directions of rotation of the rotor 10 and the rotor and stator are not "handed".

Figure 4:
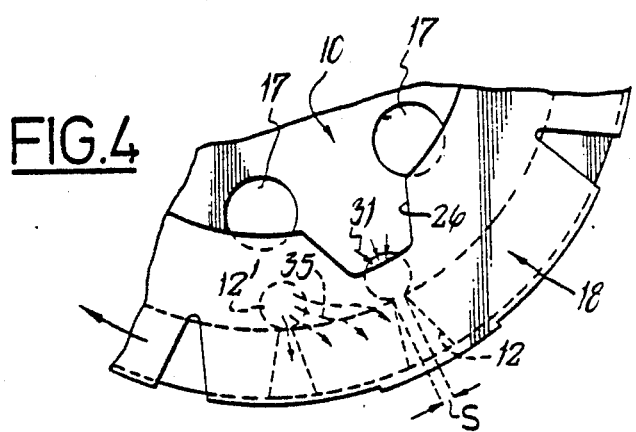
FIG. 4 shows in diagrammatic form the co-operation between stator oil access openings and tapering rotor thermal relief slots to provide an improved radial flow of coolant across the brake disc stack.

The inner periphery of stator 18 is provided with oil access openings in the form of cut-outs 26. The included angle $\gamma$ between the sides 27 of cut-outs is typically 45° and the bases of the cut-outs are radiused at 28. The radial extent Z of cut-outs 26 is such that the radially outer portions of cut-outs 26 periodically overlap the radially inner portions of part-circular apertures 16 as rotor 10 rotates. This can be seen from FIG. 4.

Typically in a stator of 9 inches external diameter the radial extent Z is 0.69 inches and the circumferential width W is 1.5 inches. This size cut-out 26 is designed to overlap with apertures 16 of say 0.49 inches diameter centred 0.13 inches from the radially outer limits of the cut-outs 26.

The purpose of cut-outs 26, in addition to providing an additional thermal relief function, is to provide an easier flow path for coolant oil from the centre of the brake disc stack radially outwardly to the inner periphery of the friction band 15 and beyond. Referring to FIG. 5 it will be seen that the presence of cut-outs 26 enables oil to easily reach the radially outer radiused ends 28 of the cut-outs as shown by arrows 31 and from this location to reach the inner periphery of the friction band 15 via axial gaps 32 between adjacent rotors and stators and via part-circular apertures 16. Oil flow radially outwardly from the inner periphery of the friction band 15 is via the previously referred to spiral grooves.

It will be appreciated that without the presence of cut-outs 26 and apertures 16 oil would have to travel to the inner periphery of the friction band 15 from the inner periphery of the stator discs entirely via the axial gaps 32 between the rotors and stators and thus oil flow to the inner periphery of the friction band would be more restricted.

As referred to above the apertures and cut-outs 16 and 26 periodically partially overlap as the rotor 10 rotates so that apertures 16 periodically receive a direct replenishment of oil from cut-outs 26. This oil is then dissipated to the inner periphery of the friction band 15 from a given aperture 16 as that aperture rotates. This action is indicated by arrows 35 associated with dotted slot detail 12' in FIG. 4 which shows a slot after it has rotated in a clockwise sense past a stator cut-out 26.

As will be appreciated any oil in a given slot 12 will be wiped over the contacting band of adjacent stators as the rotors rotate. This further improves the distribution of oil within the disc stack.

Also, as the slots 12 in the rotor successively pass over the slots 23 in the stator, the radially outward flow of oil through slots 12 will help to promote a flow of oil through slots 23 thus preventing the oil in slots 23 from becoming stagnant and thus helping to prevent a heat build up in the oil in slots 23.

The amount of oil which leaves apertures 16 via slots 12 can be controlled by appropriately sizing the gap S between the radially inner ends of edges 13, 13a.

The dotted line L in FIG. 2 indicates a typical oil level within the brake housing when the brake is in a static condition. As will be appreciated, when the vehicle to which the brake is fitted is in motion, the oil within the housing will tend to climb up the walls of the housing in an attempt to form an oil torroid.

It is also envisaged that when slots 12 are below the level of coolant oil within the brake, oil may be scooped into the slots 12 via their radially outer open ends. Any such scooped oil will serve to replenish apertures 16 and generally aid a good radial flow of oil across the disc stack.

The provision of a radially outward flow of oil via cooperating cut-outs 26 and slots 12 assists in expelling any air which might be trapped within the slots 12 as these slots are emersed under the oil level in the housing. This helps prevent a cavitation effect in slots 12 which might otherwise reduce the ability of oil to enter the outer ends of slot 12 when the slots are below the oil level.

It will be noted that the radially inner ends of rotor slots 12 (the apertures 16) and the radially outer ends of cut-outs 26 overlap in regions of the disc stack outside the annular bands of the rotors and stators which make frictional contact during a brake application. This ensures that neither slots 12 nor cut-outs 26 have closed ends which terminate within the contacting bands of the rotors and stators. This avoids the possibility of any such closed ends wearing a circumferentially extending ridge in any contacting disc member. For the same reason slots 23 are arranged to extend right across the peripheral bands of the stators which will contact the rotors during a brake application.

It will be understood, particularly in a brake in which the rotors are driven from their outer peripheries and the stators held at their inner peripheries, that the rotor and stator slot arrangement described above could be reversed so that slots 12, 16 would be provided in the stator discs and the cut-outs 26 and slots 23 would be provided in the rotor discs. In such a construction each cut-out 26 of a given rotor would successively dip under the level of oil in the housing and would then overlap in turn each aperture 16 of the slots 12 in the cooperating stator or stators to provide a radial flow path for oil. In this alternative construction the friction material would be provided on the rotors or stators as it can in the construction shown in FIGS. 1 to 5.

FIG. 5 includes (not to scale) a diagrammatic representation of part of a conventional ball and ramp actuator 40 which is used to apply the brake and comprises pressure plates 43 and 44 and balls 45 mounted in ramped recesses. As can be seen from FIG. 5, the ball and ramp actuator is positioned between two stacks 41 and 42 of interleaved rotor and stator discs and the brake is applied in the conventional manner by causing relative rotation between the pressure plates 43 and 44 which causes the balls to ride up their ramped recesses and thus displace the pressure plates apart, as indicated by arrows P, to compress the disc stacks against housing walls diagrammatically shown at 46 and 47.

The disc and brake construction described is applicable to a wide range of uses including agricultural and industrial tractors.

I claim:

1. A multiple-disc brake comprising an annular disc stack in the form of interleaved sets of axially movable rotor and stator discs of annular form, a housing containing oil or other coolant which encloses the disc stack, and an actuator for axially moving the interleaved discs into engagement with each other to apply the brake, each rotor or stator disc having on each side thereof an annular friction band which provides the only frictional contact with any co-operating disc, one set of discs being provided with a series of circumferentially spaced generally radially extending through slots which extend from one periphery of the stack across the friction bands thereof and terminate at locations outside said friction bands, the other set of discs being provided with a series of circumferentially spaced generally radially extending coolant access cut-outs which extend from the other periphery of the stack and which do not extend into said friction bands, whereby portions of the slots periodically overlap the cut-outs during relative rotation of the rotors and stators only at locations outside said friction bands to provide a radial flow path for coolant across the stack.

2. A disc brake according to claim 1 in which the coolant access cut-outs have a circumferential extent greater than that of the through slots.

3. A disc brake according to claim 1 in which both sets of discs are provided with a series of circumferentially spaced generally radially extending through slots extending from said one periphery and in which the through slots are each defined by two edges which extend away from said one periphery and are inclined to each other and do not lie on radii of the disc so that each slot tapers in a radial sense whereby the slot will execute a scissors-like action when passing over slots in a similar co-operating disc during a brake application thus reducing torque fluctuations and wear.

4. An annular rotor or stator disc for use in a multiple-disc brake, the disc having an annular friction band which is split into a number of generally arcuately-shaped areas of friction contact by a series of circumferentially spaced generally radially extending slots which pass completely through the disc in an axial sense, each slot opening through a periphery of the disc and being defined by two edges which extend away from said periphery radially across the friction band and terminating at locations outside the friction band, said edges being inclined to each other and not lying on radii of the disc so that the slot tapers in a radial sense whereby the slot will execute a sissors like action when passing over the slots in a similar co-operating disc during a brake application thus reducing torque fluctuations and wear.

* * * * *